United States Patent
Aoyama et al.

(10) Patent No.: US 6,201,064 B1
(45) Date of Patent: *Mar. 13, 2001

(54) CROSSLINKED RUBBER PARTICLES, GRAFT COPOLYMER PARTICLES AND THERMOPLASTIC RESIN COMPOSITION

(75) Inventors: Taizo Aoyama, Takasago; Katsuhiko Kimura, Akashi, both of (JP)

(73) Assignee: Kaneka Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,719

(22) Filed: Nov. 4, 1998

(30) Foreign Application Priority Data

Nov. 6, 1997 (JP) .................................................... 9-304589
Feb. 23, 1998 (JP) .................................................. 10-040165

(51) Int. Cl.$^7$ ..................................................... C08F 8/46
(52) U.S. Cl. ............................ 525/63; 525/100; 525/101; 525/104; 525/106

(58) Field of Search ...................................... 525/100, 101, 525/104, 106, 63

(56) References Cited

U.S. PATENT DOCUMENTS

| 4,946,899 | 8/1990 | Kennedy et al. | 525/244 |
| 5,242,983 | 9/1993 | Kennedy et al. | 525/309 |
| 5,395,885 | 3/1995 | Kennedy et al. | 525/98 |
| 5,840,800 | * 11/1998 | Joffre et al. | 524/806 |

* cited by examiner

Primary Examiner—Rachel Gorr
(74) Attorney, Agent, or Firm—Armstrong, Westerman, Hattori, McLeland & Naughton, LLP

(57) ABSTRACT

Crosslinked rubber particles comprising an isobutylene polymer component, an organosiloxane polymer component and optionally a vinyl polymer component, or graft copolymer particles comprising the crosslinked rubber particles and a vinyl polymer grafted onto the crosslinked rubber particles, which are useful particularly for improving the low temperature impact resistance of thermoplastic resins without impairing weatherability and heat stability thereof.

19 Claims, No Drawings

CROSSLINKED RUBBER PARTICLES, GRAFT COPOLYMER PARTICLES AND THERMOPLASTIC RESIN COMPOSITION

BACKGROUND OF THE INVENTION

The present invention relates to crosslinked rubber particles, raft copolymer particles containing the crosslinked rubber particles and thermoplastic resin compositions containing these particles. More particularly, the invention relates to crosslinked rubber particles and graft copolymer particles, which can be used as impact resistant resins having excellent weatherability and heat stability or as impact modifiers, and to thermoplastic resin compositions containing these particles.

Crosslinked rubber particles and graft copolymer particles wherein vinyl monomers are graft-polymerized onto the crosslinked rubber particles, have been widely used as impact resistant resins or as impact modifiers.

As the impact resistant resins, there are well known, for example, a high impact polystyrene (HIPS) obtained by graft-polymerizing styrene onto polybutadiene particles, and an acrylonitrile-butadiene-styrene copolymer (ABS) obtained by graft-polymerizing acrylonitrile and styrene onto polybutadiene particles.

Known also as the impact modifier are an impact modifier (MBS resin) obtained by graft-polymerizing methyl methacrylate and styrene onto polybutadiene rubber particles or styrene-butadiene copolymer rubber particles, and a weathering resistant impact modifier obtained by graft-polymerizing methyl methacrylate onto acrylic rubber particles.

The reason why the crosslinked rubber particles as mentioned above have been widely used as an impact resistant resin or an impact modifier is that even if they pass through a molten state during molding processing, they can maintain the particle shape and therefore are easy to exhibit properties as designed. The above-mentioned impact modifiers obtained by using polybutadiene rubber particles have a high effect of improving impact resistance because the glass transition temperature (Tg) of polybutadiene is low. However, these modifiers have the problem of being thermally unstable and poor in weatherability because they have unsaturated bonds in their structure.

On the other hand, the above-mentioned impact modifier obtained by using acrylic rubber particles is superior in weatherability, but the effect of improving impact resistance is not so good because the Tg is higher than polybutadiene.

For the purpose of improving the above-mentioned defects, an impact modifier using particles of a polyorganosiloxane (silicone) rubber which has a lower Tg and an excellent weatherability, is proposed. For example, Japanese Patent Publication Kokai No. 60-252613 (Japanese Patent Publication Kokoku No. 6-29303) discloses a graft polymerization product of a vinyl monomer onto silicone rubber particles, and Japanese Patent Publication Kokai No. 64-6012 and Japanese Patent Publication Kokai No. 4-100812 disclose a graft polymerization product of a vinyl monomer onto a composite rubber composed of a polyorganosiloxane rubber component and a polyalkyl (meth) acrylate rubber component.

However, even such impact modifiers are not always satisfactory in impact resistance, particularly in low temperature impact resistance, so further improvement has been desired.

An object of the present invention is to provide crosslinked rubber particles and graft copolymer particles containing the crosslinked rubber particles, which can be used as an impact resistant resin or impact modifier having a remarkably improved impact resistance, particularly low temperature impact resistance.

SUMMARY OF THE INVENTION

As a result of making an intensive study in view of such circumstances, the present inventors have found that crosslinked rubber particles comprising an isobutylene polymer component and an organosiloxane polymer component or comprising an isobutylene polymer component, an organosiloxane polymer component and a vinyl polymer component, and graft copolymer particles which are prepared by graft-polymerizing at least one vinyl monomer onto such crosslinked rubber particles, are suitable as an impact modifier which can improve the impact resistance of various kinds of resins without substantially deteriorating the weatherability of these resins.

Thus, the present invention provides crosslinked rubber particles comprising an isobutylene polymer component and an organosiloxane polymer component.

The present invention also provides crosslinked rubber particles comprising an isobutylene polymer component, an organosiloxane polymer component and a vinyl polymer component.

Further, the present invention provides graft copolymer particles characterized in that at least one vinyl monomer is graft-polymerized onto crosslinked rubber particles comprising an isobutylene polymer component and an organosiloxane polymer component.

Still further, the present invention provides graft copolymer particles characterized in that at least one vinyl monomer is graft-polymerized onto crosslinked rubber particles comprising an isobutylene polymer component, an organosiloxane polymer component and a vinyl polymer component.

Also, the present invention provides a thermoplastic resin composition comprising at least one of a crosslinked rubber comprising an isobutylene polymer component and an organosiloxane polymer component, and a graft copolymer comprising a vinyl monomer graft-polymerized onto said crosslinked rubber, and a thermoplastic resin.

Further, the present invention provides a thermoplastic resin composition comprising at least one of a crosslinked rubber comprising an isobutylene polymer component, an organosiloxane polymer component and a vinyl polymer component, and a graft copolymer comprising a vinyl monomer graft-polymerized onto said crosslinked rubber, and a thermoplastic resin.

DETAILED DESCRIPTION

The crosslinked rubber particles of the present invention comprise an isobutylene polymer component and an organosiloxane polymer component, or comprise an isobutylene polymer component, an organosiloxane polymer component and a vinyl polymer component.

Inclusion of the isobutylene polymer component and the organosiloxane polymer component exhibits an excellent effect on improvement in impact resistance, particularly in low temperature impact resistance, as compared with conventional impact modifiers. Further, the cost can be reduced by inclusion of the vinyl polymer component without impairing the effects produced by inclusion of the isobutylene polymer component and the organosiloxane polymer component.

On the other hand, the graft copolymer particles of the present invention comprise at least one vinyl monomer graft-polymerized onto the above-mentioned crosslinked rubber particles. By forming the above-mentioned crosslinked rubber particles to graft copolymer particles, the crosslinked rubber particles themselves are enabled to use as an impact resistant resin and, when used as an impact modifier, the compatibility with thermoplastic resins to be incorporated therewith, dispersibility and adhesion property are enhanced.

The unit particle which constitutes the crosslinked rubber particles of the present invention includes (A) a particle wherein the isobutylene polymer component, the organosiloxane polymer component and the vinyl polymer component are present together in a single particle, (B-1) a particle wherein the isobutylene polymer component and the organosiloxane polymer component are present together in a single particle, (B-2) a particle wherein the isobutylene polymer component and the vinyl polymer component are present together in a single particle, (B-3) a particle wherein the organosiloxane polymer component and the vinyl polymer component are present together in a single particle, (C-1) a particle wherein the isobutylene polymer component is present alone in a single particle, (C-2) a particle wherein the organosiloxane polymer component is present alone in a single particle, and (C-3) a particle wherein the vinyl polymer component is present alone in a single particle.

Of these, in the unit particles (A), (B-1), (B-2) and (B-3) a plurality of polymer components are present in a single particle, but the state thereof in the particle is not particularly limited. Examples of the state of the components are, for instance, a uniform structure particle wherein respective polymer components form a uniform phase, a multi-layer structure particle wherein respective polymer components form a layered structure, a salami-like structure particle wherein one polymer component forms a plurality of island domains in another polymer component, and the like. Such a state is observed by a transmission electron microscope.

The crosslinked rubber particles of the present invention are not particularly limited, so long as they are composed of a single kind or at least two kinds of the above-mentioned unit particles and they contain the isobutylene polymer component and the organosiloxane polymer component or contain the isobutylene polymer component, the organosiloxane polymer component and the vinyl polymer component.

Examples of the crosslinked rubber particles comprising the isobutylene polymer component and the organosiloxane polymer component are, for instance, particles composed of the particle (B-1) alone, and particles composed of the particles (C-1) and (C-2).

Also, examples of the crosslinked rubber particles comprising the isobutylene polymer component, the organosiloxane polymer component and the vinyl polymer component are, for instance, particles composed of the particle (A) alone, particles composed of the particles (B-1) and (C-3), particles composed of the particles (B-2) and (C-2), particles composed of the particles (B-3) and (C-1), particles composed of the particles (C-1), (C-2) and (C-3).

Of the above-mentioned crosslinked rubber particles, the particles composed of the particle (B-1) alone or the particle (A) alone is preferred from the viewpoint of being superior in enhancement of impact resistance when used as an impact modifier, the particles composed of the particles (C-1) and (C-2) or the particles (C-1), (C-2) and (C-3) is preferred from the viewpoint of ease in production, and the particles composed of the particles (B-1) and (C-3), the particles (B-2) and (C-2) or the particles (B-3) and (C-1) is preferred from the viewpoint of a balance between enhancement of impact resistance and ease in production.

The largest feature of the crosslinked rubber particles of the present invention resides in combination use of the isobutylene polymer component and the organosiloxane polymer component. That the particles are composed of these components can be evaluated by measuring an infrared absorption spectrum. That is to say, an infrared absorption spectrum of particles is measured, and from the absorption at 1,365 $cm^{-1}$ peculiar to the isobutylene polymer component and the absorption at 805 $cm^{-1}$ peculiar to the organosiloxane polymer component, the contents of the isobutylene polymer component and the organosiloxane polymer component can be determined.

The gel fraction of the crosslinked rubber particles is preferably from 20 to 100%, more preferably from 40 to 100%, still more preferably from 70 to 100%. If the gel fraction is too small, the effect of improving impact resistance and the processability tend to become insufficient.

The proportions of the isobutylene polymer particles, the organosiloxane polymer component and the vinyl polymer component in the crosslinked rubber particles are not particularly limited, and may be suitably adjusted in accordance with the purposes. It is preferable that the proportion of the isobutylene polymer component is from 1 to 99%, especially from 10 to 99%, more especially from 20 to 99%, the proportion of the organosiloxane polymer component is from 1 to 99%, especially from 1 to 90%, more especially from 1 to 80%, and the proportion of the vinyl polymer component is from 0 to 90%, especially from 0 to 70%, more especially from 0 to 50%. If the proportion of the isobutylene polymer component is too small or too large, the effect of improving impact resistance tends to become insufficient. Also, if the proportion of the organosiloxane polymer component is too small, the impact resistance-improving effect tends to become insufficient, and if the proportion of the organosiloxane polymer component is too large, the impact resistance-improving effect and the processability tend to become insufficient. Further, if the proportion of the vinyl polymer component is too large, the impact resistance-improving effect tends to become insufficient.

From the viewpoint of sufficiently exhibiting the impact resistance-improving effect, it is preferable that the crosslinked rubber particles have an average particle size of 0.05 to 10 $\mu$m, especially 0.05 to 5 $\mu$m, more especially 0.05 to 3 $\mu$m. When the average particle size is less than 0.05 $\mu$m, the impact resistance-improving effect tends to become insufficient, and when it exceeds 10 $\mu$m, too, the impact resistance-improving effect tends to become insufficient.

The isobutylene polymer component which constitutes the crosslinked rubber particles is a component derived from an isobutylene polymer containing at least 50% of units derived from isobutylene. The isobutylene polymer is obtained by a method such as cationic polymerization.

Preferably, the isobutylene polymer contains at least one reactive functional group at its molecular end and/or in its molecular chain.

The units other than the isobutylene unit, which constitute the isobutylene polymer, include a unit derived from an initiator used when preparing the isobutylene polymer, a unit derived from a cationically polymerizable monomer which is used in the preparation of the isobutylene polymer as occasion demands, a unit having a reactive functional group introduced into the molecular end and/or the molecular chain (including side chains) of the isobutylene polymer, and the like.

Examples of the unit derived from an initiator used when preparing the isobutylene polymer are —C(CH$_3$)$_2$—C$_6$H$_4$—C(CH$_3$)$_2$—, —C(CH$_3$)$_2$—C$_6$H$_4$—(CH$_2$)$_2$—C$_6$H$_4$—C(CH$_3$)$_2$—, —C(CH$_3$)$_2$—(CH$_2$)$_2$—C(CH$_3$)$_2$—, C$_6$H$_5$—C(CH$_3$)$_2$—, and the like. Of these, —C(CH$_3$)$_2$—C$_6$H$_4$—C(CH$_3$)$_2$— is preferable from the viewpoint of introduction rate of functional group to the isobutylene polymer.

Examples of the unit derived from a cationically polymerizable monomer which is used in the preparation of the isobutylene polymer as occasion demands are a unit derived from isoprene monomer, a unit derived from butadiene monomer, a unit derived from styrene monomer, a unit derived from α-methylstyrene monomer, a unit derived from a vinyl ether monomer, a unit derived from 1-butene monomer, and the like. Among these, the unit derived from isoprene monomer is preferable from the viewpoint of a reactivity with isobutylene.

The unit having a reactive functional group introduced into the molecular end and/or the molecular chain includes a unit having a group as represented by the formula (I) described after, e.g., dimethoxymethylsilyl group, trimethoxysilyl group, diethoxymethylsilyl group, methoxydimethylsilyl group, allyl group, vinyl group, methacryloyl group, acryloyl group or isopropenyl group, a unit having a group containing an unsaturated double bond derived, for instance, from a conjugated diene monomer, a unit derived from isoprene monomer, a unit derived from butadiene monomer, and the like. Among these, the unit derived from isoprene monomer is preferable from the viewpoint of ease in the introduction, and the unit having dimethoxymethylsilyl group is preferable from the viewpoint of the reactivity.

Examples of the unit having a reactive functional group introduced into the molecular end and/or the molecular chain of the isobutylene polymer are, for instance, units represented by the formula (I):

—R—X (I)

wherein R is a single bond or a divalent hydrocarbon group having 1 to 20 carbon atoms, and X is a halogen atom, e.g., chlorine atom or bromine atom, vinyl group, allyl group, isopropenyl group, acryloyl group, methacryloyl group, epoxy group, amino group, cyano group, isocyano group, cyanate group, isocyanate group, carboxyl group, acid anhydride residue, hydroxyl group, mercapto group or a silicon-containing group represented by the formula (II):

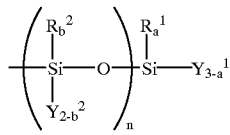

(II)

wherein R$^1$ and R$^2$ are individually a monovalent hydrocarbon group having 1 to 20 carbon atoms or a triorganosiloxy group, Y$^1$ and Y$^2$ are individually hydroxyl group or a hydrolyzable group, e.g., hydrogen atom, alkoxyl group, acyloxy group, ketoximate group, amino group, amido group, aminoxy group, mercapto group or alkenyloxy group, and may be the same or different when they exist two or more, a is 0 or an integer of 1 to 3, b is 0 or an integer of 1 to 2, and n is 0 or an integer of 1 to 18; provided that each of R$^1$, R$^2$, Y$^1$ and Y$^2$ themselves may be the same or different when each group exists plurally.

The halogen atom identified as X in the formula (I) includes, for instance, chlorine atom and bromine atom.

The hydrolyzable group identified as Y$^1$ and Y$^2$ in the formula (II) includes, for instance, hydrogen atom, alkoxyl group, acyloxy group, ketoximate group, amino group, amido group, aminoxy group, mercapto group or alkenyloxy group. Of these, an alkoxyl group is particularly preferable from the viewpoints of mild hydrolyzability and ease in handling.

Isobutylene polymers having in the molecular end and/or the molecular chain at least one reactive functional group selected from a halogen-containing group, a radically reactive unsaturated group such as vinyl group, allyl group, isopropenyl group, acryloyl group or methacryloyl group, and a silicon-containing group, are preferable from the viewpoints of availability and ease in handling.

Also, isobutylene polymers having a reactive functional group derived from a conjugated diene monomer in the molecular end and/or the molecular chain are preferable from the viewpoints of versatility and low cost. Isobutylene polymers having allyl group or a silicon-containing group as a reactive functional group are preferable from the viewpoints of conversion and enhancement of impact resistance.

Among the above-mentioned isobutylene polymers, an allyl group-terminated polyisobutylene which has allyl group as a reactive functional group at the molecular end and a silicon-containing group-terminated polyisobutylene which has a silicon-containing group as a reactive functional group at the molecular end are particularly preferred from the viewpoint of ease in controlling the crosslinking structure.

The number average molecular weight of the isobutylene polymers is preferably from 300 to 1,000,000, especially from 300 to 100,000. If the number average molecular weight is less than 300, too much unreacted material remains, and if the number average molecular weight is more than 1,000,000, the viscosity is high and it tends to be difficult to handle.

Examples of the isobutylene polymer having a reactive functional group represented by the formula (I) at the molecular end are, for instance, a low molecular weight polyisobutylene oil having an average molecular weight of about 300 to about 5,000, e.g., Nisseki Polybutene HV-3000 (isopropenyl group-terminated isobutylene polymer, made by Nippon Sekiyu Kagaku Kabushiki Kaisha), Nissan Polybutene 200N (isopropenyl group-terminated isobutylene polymer, made by NOF Corporation) and Idemitsu Polybutene 300R (isopropenyl group-terminated isobutylene polymer, made by Idemitsu Sekiyu Kagaku Kabushiki Kaisha); a high molecular weight polyisobutylene having a viscosity average molecular weight of 30,000 to 60,000 and commercially available under the trade mark "Tetolax" (isopropenyl group-terminated isobutylene polymer, made by Nippon Petrochemicals Co., Ltd.); a polyisobutylene having an allyl terminal group as disclosed in JP-B-7-53768; a polyisobutylene having a silicon-containing terminal group as disclosed in JP-B-4-69659; and the like.

The reactive functional group which can be present in the molecular chain of the isobutylene polymer includes, for instance, a group having an unsaturated double bond derived from a diene monomer. Typical example of such a diene monomer is, for instance, isoprene.

Examples of the isobutylene polymer having a group containing the above-mentioned radically reactive unsaturated group in the molecular chain are a copolymer comprising units derived from isobutylene monomer and units derived from isoprene monomer, which is generally known as so-called "butyl rubber" and is commercially available, e.g., JSR Butyl 268 (isobutylene-isoprene copolymer, made by Japan Synthetic Rubber Co., Ltd.), KALAR5263 and KALENE800 (isobutylene-conjugated diene copolymer, both available from HARDMAN INCORPORATED), and the like.

As the isobutylene polymers used in the present invention, those having in the molecular end and/or the molecular chain at least one reactive functional group selected from the group consisting of a halogen-containing group, vinyl group, allyl group, isopropenyl group, acryloyl group, methacryloyl group and a silicon-containing group are preferable from the viewpoints of availability and ease in handling. Also, isobutylene polymers having a reactive functional group derived from a diene monomer in the molecular end and/or the molecular chain are preferable from the viewpoints of versatility and low cost. Isobutylene polymers having allyl group or a silicon-containing group as a reactive functional group are also preferable from the viewpoints of enhancement of impact resistance and transparency. Further, among these isobutylene polymers, an allyl group-terminated polyisobutylene which has allyl group as a reactive functional group at the molecular end and a silicon-containing group-terminated polyisobutylene which has a silicon-containing group as a reactive functional group at the molecular end are particularly preferred from the viewpoint of ease in controlling the crosslinking structure.

The isobutylene polymers used in the present invention may contain a moiety derived from a crosslinking agent and/or a graftlinking agent as mentioned after in order to raise the gel fraction.

Preferably, the content of the moiety derived from a crosslinking agent and/or a graftlinking agent is from 0 to 20%, especially from 0 to 10%, with respect to the moiety derived from a crosslinking agent, and is from 0 to 20%, especially from 0 to 10%, with respect to a graftlinking agent. These ranges are desirable from the viewpoint of a balance between impact resistance-improving effect and processability.

The organosiloxane polymer component which constitutes the crosslinked rubber particles is a component derived from an organosiloxane polymer obtained by a ring-opening polymerization or condensation polymerization of an organosiloxane monomer.

The organosiloxane monomers are organosiloxane compounds which are ring-opening polymerizable or condensation-polymerizable. Examples thereof are, for instance, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, octaethylcyclotetrasiloxane, dimethyldimethoxysiloxane, diethyldimethoxysilane, diethyldiethoxysilane, diphenyldimethoxysilane, and the like. These may be used alone or in admixture thereof. Among them, octamethylcyclotetrasiloxane is preferable from the viewpoints of versatility, low cost and ease in handling.

The organosiloxane polymer used in the present invention may contain a moiety derived from a crosslinking agent and/or a graftlinking agent mentioned after.

Preferably, the content of the moiety derived from a crosslinking agent and/or a graftlinking agent is from 0 to 20%, especially from 0 to 10%, for the moiety derived from the crosslinking agent, and is from 0 to 20%, especially from 0 to 10%, for the moiety derived from the graftlinking agent. These ranges are desirable from the viewpoint of a balance between impact resistance-improving effect and processability.

The vinyl polymer component which constitutes the crosslinked rubber particles is a component derived from a vinyl polymer obtained by a radical polymerization of a vinyl monomer.

Any radically polymerizable unsaturated compounds can be used as the vinyl monomer without any restriction. Preferable examples of the vinyl monomer are, for instance, an acrylic ester such as methyl acrylate, ethyl acrylate, n-propyl acrylate, n-butyl acrylate, 2-ethylhexyl acrylate or n-octyl acrylate; a methacrylic ester such as methyl methacrylate, ethyl methacrylate, butyl methacrylate, 2-ethylhexyl methacrylate, cyclohexyl methacrylate, benzyl methacryalte or isobornyl methacrylate; an aromatic alkenyl compound such as styrene, α-methylstyrene, p-methylstyrene or vinyltoluene; a vinyl cyanide compound such as acrylonitrile or methacrylonitrile; a conjugated diene compound such as butadiene or isoprene; a halogen-containing unsaturated compound such as vinyl chloride or vinylidene chloride; and other vinyl compounds. These may be used alone or in admixture thereof. Of these, n-butyl acrylate, methyl methacrylate and styrene are preferable from the viewpoints of versatility, low cost and ease in handling.

The vinyl polymer used in the present invention may contain a moiety derived from a crosslinking agent and/or a graftlinking agent mentioned after.

Preferably, the content of the moiety derived from a crosslinking agent and/or a graftlinking agent is from 0 to 20%, especially from 0 to 10%, for the moiety derived from the crosslinking agent, and is from 0 to 20%, especially from 0 to 10%, for the moiety derived from the graftlinking agent. These ranges are desirable from the viewpoint of a balance between impact resistance- improving effect and processability.

The above-mentioned isobutylene polymer component, organosiloxane polymer component and vinyl polymer component which constitute the crosslinked rubber particles of the present invention may be, as stated above, components derived from polymers containing, as occasion demands, a moiety derived from a crosslinking agent and/or a graftlinking agent.

The crosslinking agent is a compound having a plurality of functional groups in a molecule, and these plural functional groups have the same reactivity. The graftlinking agent is a compound having a plurality of functional groups in a molecule, and these plural functional groups have a different reactivity. The crosslinking agent is used for the purpose of producing crosslinkages in a single polymer component, and the graftlinking agent is used for the purpose of producing crosslinkages between different polymer components. In practical action, however, there are cases where the crosslinking agent may produce crosslinkages between different polymer components, and the graftlinking agent may produce crosslinkages in a single polymer component, so the distinction of the actions of both agents is not definite.

Examples of the crosslinking agent are, for instance, a trifunctional silane compound such as trimethoxymethylsilane or triethoxyphenylsilane; a tetrafunctional silane compound such as tetramethoxysilane, tetraethoxysilane, tetrapropoxysilane or tetrabutoxysilane; a difunctional vinyl compound such as ethylene glycol dimethacrylate, propylene glycol dimethacrylate, 1,3-butylene glycol dimethacrylate, 1,4-butylene glycol dimethacrylate or divinyl benzene; a trifunctional vinyl compound such as triallyl cyanurate or triallyl isocyanurate; and the like. These may be used alone or in admixture thereof. These crosslinking agents can be suitably selected according to the presence or absence and the kind of a functional group in the isobutylene polymer, and the kind of a polymer to be crosslinked.

Examples of the graftlinking agent are, for instance, a (meth)acrylic functional silane compound such as β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, γ-methacryloyloxypropyltriethoxysilane, δ-methacryloyloxybutyldiethoxymethylsilane, γ-acryloyloxypropyldimethoxymethylsilane or γ-acryloyloxypropyltrimethoxysilane; an ethylenic functional silane compound such as vinyltrimethoxysilane, vinyldimethoxymethylsilane, vinyltriethoxysilane, p-vinylphenyltrimethoxysilane or p-vinylphenyldimethoxymethylsilane; a mercapto functional silane compound such as γ-mercaptopropyltrimethoxysilane or γ-mercaptopropyldimethoxymethylsilane; a vinyl compound such as allyl methacrylate; and the like. These may be used alone or in admixture thereof. These graftlinking agents can be suitably selected according to the presence or absence and the kind of a functional group in the isobutylene polymer, and the kind of a polymer to be graftlinked.

The crosslinking agent and the graftlinking agent may be used alone or in admixture of two or more of them. The amount of the crosslinking agent and/or the graftlinking agent is preferably at least 0. 1 part (part by weight, hereinafter the same), more preferably at least 0.3 part, per 100 parts of the total of the isobutylene polymer which constitutes the isobutylene polymer component, the organosiloxane monomer which constitutes the organosiloxane polymer component, and the vinyl monomer which constitutes the vinyl polymer component, so that the effect of use of these agents is sufficiently exhibited. It is also preferable that the amount of the crosslinking agent and/or the graftlinking agent is at most 25 parts, especially at most 10 parts, per 100 parts of the total of the isobutylene polymer, the organosiloxane monomer and the vinyl monomer, so that the obtained crosslinked rubber particles exhibit a sufficient impact resistance-improving effect and rise of cost is suppressed.

The process for preparing such crosslinked rubber particles is not particularly limited. It is possible to prepare the particles in a single stage or multistage by utilizing emulsion polymerization method or micro-suspension polymerization method. For example, a latex of crosslinked rubber particles is obtained by mixing with shearing a liquid mixture of an isobutylene polymer, an organosiloxane monomer, a vinyl monomer, a crosslinking agent, a graftlinking agent and optionally a usual radical polymerization initiator with water in the presence of an emulsifier and optionally a dispersion stabilizer such as a higher alcohol, for example, using a homogenizer to emulsify the mixture, and carrying out a polymerization. At that time, a polymerization reaction of the organosiloxane monomer can be accelerated by acidifying the reaction system with an inorganic acid such as hydrochloric acid, sulfuric acid or nitric acid, or an organic acid having a surface activity such as alkylbenzene sulfonate, alkyl sulfonate or alkyl sulfate.

As mentioned above, the crosslinked rubber particles of the present invention may contain a plurality of polymer components in a single particle, or may be composed of particles each comprising a single polymer component. The particles containing a plurality of polymer components in a single particle can be prepared by a method wherein respective components are previously mixed uniformly, emulsified and subjected to a reaction, a method wherein, in the presence of seed particles composed of a single polymer component, other components are further subjected to polymerization (seed polymerization), a method wherein particles each comprising a single polymer component are mixed and are then agglomerated to enhance the particle size by adding an acid such as hydrochloric acid or a salt such as sodium sulfate, or other methods. At that time, the state inside the obtained particles can be controlled by the preparation method, the proportions of respective components, the order of reaction, and the like.

The thus prepared latex of crosslinked rubber particles can be directly used as a coating material, an adhesive or the like, and can also be used after salting out to separate and recover the crosslinked rubber particles.

Also, crosslinked rubber-based graft copolymer particles can be obtained by subjecting the above-mentioned crosslinked rubber particles to a graft copolymerization with a vinyl monomer mentioned after.

The vinyl monomer to be graft-copolymerized onto the crosslinked rubber particles includes various kinds of vinyl monomers, for instance, an acrylic ester such as methyl acrylate, ethyl acrylate, n-propyl acrylate, n-butyl acrylate, 2-ethylhexyl acrylate or n-octyl acrylate; a methacrylic ester such as methyl methacrylate, ethyl methacrylate, butyl methacrylate, 2-ethylhexyl methacrylate, cyclohexyl methacrylate, benzyl methacrylate or isobornyl methacrylate; an aromatic alkenyl compound such as styrene, α-methylstyrene or p-methylstyrene; a vinyl cyanide compound such as acrylonitrile or methacrylonitrile; a conjugated diene compound such as butadiene or isoprene; and a halogen-containing unsaturated compound such as vinyl chloride or vinylidene chloride. These may be used alone or in admixture thereof. These vinyl monomers are suitably selected in accordance with a combination with various resins to be improved in impact resistance.

Also, in the graft polymerization, either or both of the crosslinking agent and the graftlinking agent can be used, as occasion demands. The total amount of the crosslinking agent and the graftlinking agent is from 0 to 20 parts, especially 0 to 10 parts, per 100 parts of the vinyl monomer used in the graft polymerization. If the total amount is more than 20 parts, the impact resistance-improving effect tends to become insufficient.

The proportions of the crosslinked rubber particles and the vinyl monomer for graft polymerization in the crosslinked rubber-based graft copolymer particles of the present invention is not particularly limited. Preferably, based on the whole weight of the graft copolymer particles, the proportion of the crosslinked rubber particles is from 30 to 95%, especially from 40 to 90%, and the proportion of the vinyl monomer for graft polymerization is from 5 to 70%, especially from 10 to 60%. If the proportion of the graft polymerization vinyl monomer is less than 5%, the graft polymer particles tend to be insufficiently dispersed in a resin, and if the proportion is more than 70%, the impact resistance-improving effect tends to decrease.

The graft efficiency in the crosslinked rubber-based graft copolymer particles of the present invention is not particularly limited, but preferably it is at least 30%, especially at least 50%. If the graft efficiency is less than 30%, the compatibility with various resins tends to lower.

It is preferable, from the viewpoint of the impact resistance-improving effect being sufficiently exhibited, that the average particle size of the crosslinked rubber-based graft copolymer particles of the present invention is from 0.05 to 10 µm, especially from 0.05 to 3 µm. When the average particle size is less than 0.05 µm, the impact resistance-improving effect tends to become insufficient. When the average particle size is more than 10 µm, too, the impact resistance-improving effect tends to become insufficient.

The process for preparing the crosslinked rubber-based graft copolymer particles of the present invention is not particularly limited, but preferably the graft copolymer is prepared, for example, by a process wherein the above-mentioned vinyl monomer for graft polymerization is added to the above-mentioned crosslinked rubber particle latex and polymerized by a radical polymerization technique in a single stage or multi-stages to give a latex of the graft copolymer. In case that the crosslinked rubber particle latex has been prepared in a reaction system made acidic, the crosslinked rubber particle latex may be neutralized prior to conducting the graft polymerization by adding an aqueous solution of an alkali such as sodium hydroxide, potassium hydroxide or sodium carbonate to the latex.

The thus obtained latex of the crosslinked rubber-based graft copolymer particles can be directly used as, for example, a coating material or an adhesive, and can also be subjected to salting out to separate and recover the graft copolymer particles. The crosslinked rubber particles and the crosslinked rubber-based graft copolymer particles obtained by the above-mentioned processes can themselves be used as a molding material having an impact resistance, but are useful as an impact modifier capable of providing a high degree of impact resistance to various thermoplastic and thermosetting resins when incorporated into these resins. Besides, they can also be used as a processability improver, a compatibilizer, a delustering agent, a heat resistance improver and the like. Improvement in gas barrier property based on isobutylene polymer is also expectable.

Examples of the thermoplastic resins to which the crosslinked rubber-based graft copolymer particles of the present invention are applicable to improve the impact resistance thereof are, for instance, polymethyl methacrylate resin, polyvinyl chloride resin, polyethylene resin, polypropylene resin, cyclic olefin copolymer resin, polycarbonate resin, polyester resin, a mixture of polycarbonate resin and polyester resin, a homopolymer or copolymer of 70 to 100% of at least one vinyl monomer selected from the group consisting of an aromatic alkenyl compound, a vinyl cyanide compound and a (meth)acrylic acid ester and 30 to 0% of at least one other monomer copolymerizable therewith, e.g., other vinyl monomer such as ethylene, propylene or vinyl acetate and a conjugated diene monomer such as butadiene or isoprene, polystyrene resin, polyphenylene ether resin, a mixture of polystyrene resin and polyphenylene ether resin, and the like. A wide range of thermoplastic resins are usable without being limited to the exemplified reisns. Polymethyl methacrylate resin, polyvinyl chloride resin, polypropylene, cyclic olefin copolymers, polycarbonate resin and polyester resin are particularly preferable since effects of improvement in weatherability, impact resistance and the like are easy to be produced.

The amount of the crosslinked rubber particles or the crosslinked rubber-based graft copolymer to be added to a thermoplastic resin is preferably from 0.1 to 50 parts, more preferably from 1 to 30 parts, per 100 parts of the thermoplastic resin. If the amount is less than 0.1 part, the impact resistance-improving effect tends to become insufficient, and if the amount is more than 50 parts, the properties of the thermoplastic resin tend to be impaired.

Addition of the crosslinked rubber-based graft copolymer particles of the present invention to various resins is performed, for example, by mechanically mixing them and forming into pellets using a known apparatus such as Banbury mixer, roll mill or twin-screw extruder. The pellets formed by extrusion can be molded in a wide temperature range, for example, by usual injection molding machine, blow molding machine or extruder.

This resin composition may be further incorporated with an impact modifier, a stabilizer, a plasticizer, a lubricant, a flame retardant, a pigment, a filler and the like, as occasion demands, more particularly an impact modifier such as methyl methacrylate-butadiene-styrene copolymer (MBS resin), acrylic graft copolymer or acryl-silicone composite rubber-based graft copolymer; a stabilizer such as triphenyl phosphite; a lubricant such as polyethylene wax or polypropylene wax; a phosphate flame retardant such as triphenyl phosphate or tricresyl phosphate, a bromine-containing flame retardant such as decabromobiphenyl or decabromobiphenyl ether, a flame retardant such as antimony trioxide; a pigment such as titanium oxide, zinc sulfide or zinc oxide; a filler such as glass fiber, asbestos, wollastonite, mica, talc or calcium carbonate; and the like.

The present invention is more specifically explained by means of the following examples, but is not limited only to these examples.

Evaluation was made in the following manner.
(Gel fraction)

The obtained crosslinked rubber particles were immersed in toluene and stirred at room temperature for 8 hours, and a toluene-insoluble matter was separated by centrifugation at 30,000 r.p.m. for 60 minutes. The weight percentage of the toluene-insoluble matter in the crosslinked rubber particles was calculated.
(Siloxane content)

An infrared absorption spectrum of the obtained crosslinked rubber particles was measured, and the content of the organosiloxane polymer component was calculated from absorption at 1,365 cm$^{-1}$ peculiar to the isobutylene polymer component and absorption at 805 cm$^{-1}$ peculiar to the organosiloxane polymer component.
(Graft efficiency)

The toluene-insoluble matter of the crosslinked rubber-based graft copolymer particles was measured in the same manner as the above-mentioned measurement of the gel fraction of crosslinked rubber particles, and the proportion of the increase of toluene-insoluble matter resulting from graft polymerization was calculated based on the graft polymerization vinyl monomer charged (methyl methacrylate and n-butyl acrylate).
(Izod impact strength)

V-notched Izod impact strength was measured at 23° C. according to ASTM D256-56.
(Weatherability)

After exposing a specimen in a sunshine weather—O—meter (63° C., with shower) for 500 hours and 1,000 hours, the Izod impact strength (notched) was measured in the same manner as above.

The abbreviations in tables denote the following materials.
Si-PIB: Polyisobutylene having a silicon-containing terminal group
TSMA: γ-Methacryloyloxypropyltrimethoxysilane
D4: Octamethyltetracyclosiloxane
TEOS: Tetraethoxysilane
BA: n-Butyl acrylate
AlMA: Allyl methacrylate MMA: Methyl methacrylate PVC: Polyvinyl chloride resin, S1008 (made by Kaneka Corporation)

PP: Polypropylene resin, Norblen D501 (made by Sumitomo Chemical Company, Ltd.)

COC: Cyclic polyolefin, Apel 6013 (made by Mitsui Petrochemical Industries, Ltd.)

PC: Polycarbonate resin, L-1250 (made by Teijin Kasei Kabushiki Kaisha)

PBT: Polybutylene terephthalate resin, Juranex 2002 (made by Polyplastics Kabushiki Kaisha)

FM-21: Acrylic impact modifier, Kaneace FM-21 (made by Kaneka Corporation)

EPR: Ethylene-propylene rubber, Toughmer P0680 (made by Mitsui Petrochemical Industries, Ltd.)

EXAMPLE 1

There were mixed 80 parts of an isobutylene polymer having a silicon-containing terminal group as an isobutylene polymer (a polymer having a number average molecular weight of 5,000 and containing about 90% of units derived from isobutylene monomer, prepared using p-dicumyl chloride as an initiator by a method disclosed in Japanese Patent Publication Kokoku No. 4-69659, silicon-containing terminal group being dimethoxymethylsilyl group), 0.8 part of γ-methacryloyloxypropyltrimethoxysilane (TSMA) and 40 parts of heptane. The resulting mixture was added to 160 parts of water in which 1.12 parts of sodium lauryl sulfate was dissolved. It was preliminarily dispersed into water by a homomixer at 30,000 r.p.m. and was then emulsified under a pressure of 900 kg/cm$^2$ by a homogenizer. The resulting mixture was placed in a separable flask equipped with a condenser, a nitrogen feeding tube and a stirrer, and thereto was added 2.4 parts of 1N hydrochloric acid in a nitrogen stream with stirring at 250 r.p.m. to adjust the system to pH about 2 and was further stirred for 15 minutes. The reaction system was then heated to 70° C. and the reaction was conducted at that temperature for 2 hours. The reaction mixture was neutralized with 2.4 parts of a 1N aqueous solution of sodium hydroxide.

Thereto was added an octamethyltetracyclosiloxane dispersion obtained by adding a mixture of 20 parts of octamethyltetracyclosiloxane as an organosiloxane compound, 0.6 part of tetraethoxysilane and 0.2 part of γ-methacryloyloxypropyltrimethoxysilane to 40 parts of water in which 0.28 part of sodium lauryl sulfate was dissolved, and dispersing it into water by a homomixer at 30,000 r.p.m. The reaction was carried out at 70° C. for 1 hour with stirring at 250 r.p.m.

Thereafter, the system was adjusted to pH about 1 by adding 12 parts of 1N hydrochoric acid, and it was heated to 90° C. and stirred at 250 r.p.m. for 5 hours at that temperature. After the completion of the reaction, the reaction mixture was allowed to stand overnight at room temperature, and the system was neutralized by adding 12 parts of a 1N aqueous solution of sodium hydroxide to give a latex of crosslinked rubber particles. The average particle size of the obtained crosslinked rubber particle latex was 0.28 μm. A part of the obtained latex was coagulated by salting out, and the precipitated particles were separated, washed and dried at 40° C. for 15 hours to give crosslinked rubber crumbs. The obtained crosslinked rubber particles (R-1) had a gel fraction of about 85%. Observation of the obtained crosslinked rubber particles by a transmission electron microscope indicated that most of the particles contained the isobutylene polymer component and the organosiloxane polymer component in a single particle, and a slight amount of particles composed of only isobutylene polymer component were also present.

The above crosslinked rubber latex was taken out in an amount of 80 parts on a solid basis and placed in a separable flask equipped with a condenser, a nitrogen feeding tube, a dropping funnel and a stirrer. The total amount of water was adjusted to 300 parts, and thereto were then added 0.001 part of ferrous sulfate, 0.004 part of disodium ethylenediaminetetraacetate and 0.1 part of formaldehyde sodium sulfoxylate. The mixture was heated to 70° C. with stirring at 250 r.p.m. in a nitrogen stream.

Subsequently, 18.0 parts of methyl methacrylate, 2.0 parts of n-butyl acrylate and 0.04 part of cumene hydroperoxide were put in the dropping funnel, and added dropwise to the rubber latex over 2 hours, followed by stirring at 70° C. for 2 hours. The conversion was 98%. The obtained latex of crosslinked rubber-based graft copolymer particles was coagulated by salting out, and the resulting particles were separated, washed and dried at 40° C. for 15 hours to give a powder of crosslinked rubber-based graft copolymer. The obtained crosslinked rubber-based graft copolymer particles (S-1) had a graft efficiency of 95% and an average particle size of 0.3 μm.

The results are shown in Table 1.

Then, 10 parts of the graft copolymer (S-1) was incorporated as an impact modifer into a mixture of 100 parts of a vinyl chloride resin (S1008, made by Kaneka Corporation) as a thermoplastic resin, 2.5 parts of dibutyl tin maleate as a stabilizer, 0.5 part of a lubricant Hoechst Wax E (made by Hoechst Japan), 2.0 parts of a processing aid PA-20 (made by Kaneka Corporation) and 3.0 parts of titanium oxide as a pigment. The mixture was kneaded for 5 minutes through rolls set at 180° C. to form a sheet, and then subjected to heat press molding at 190° C. to give a specimen of a 5 mm thick molded article for evaluation of physical properties.

The results are shown in Table 2.

EXAMPLES 2 AND 3

Crosslinked rubber-based graft copolymer particles (S-2) and (S-3) were prepared in the same manner as in Example 1 except that the amounts of the crosslinked rubber particles and the vinyl monomer to be grafted were changed as shown in Table 1. The gel fraction, graft efficiency, particle size, Izod impact strength and weatherability were measured in the same manner as in Example 1. The results are shown in Tables 1 and 2.

EXAMPLE 4

Crosslinked rubber particles (R-2) and crosslinked rubber-based graft copolymer particles (S-4) were prepared in the same manner as in Example 1 except that the amount of the isobutylene polymer, the amount of the organosiloxane compound and the like were changed as shown in Table 1. The gel fraction, graft efficiency, particle size, Izod impact strength and weatherability were measured in the same manner as in Example 1. The results are shown in Tables 1 and 2.

EXAMPLE 5

There were mixed 40 parts of an isobutylene polymer having a silicon-containing terminal group (a polymer having an average molecular weight of 5,000 and containing about 90% of units derived from isobutylene monomer, prepared using p-dicumyl chloride as an initiator by a method disclosed in Japanese Patent Publication Kokoku No. 4-69659, silicon-containing terminal group being dimethoxymethylsilyl group), 0.4 part of γ-methacryloyloxypropyltrimethoxysilane, 40 parts of n-butyl acrylate as a vinyl monomer and 0.4 part of allyl methacrylate. The resulting mixture was added to 160 parts of water in which 1.12 parts of sodium lauryl sulfate was dissolved. It was preliminarily dispersed into water with a homomixer at 30,000 r.p.m. and was then emulsified under a pressure of 900 kg/cm$^2$ with a homogenizer. The resulting mixture was placed in a separable flask equipped with a condenser, a nitrogen feeding tube and a stirrer, and thereto was added 2.4 parts of 1N hydrochloric acid in a nitrogen stream with stirring at 250 r.p.m. to adjust the system to pH about 2 and was further stirred for 15 minutes. The reaction system was then heated to 70° C. and the reaction was conducted at that temperature for 5 hours. The reaction mixture was neutralized with 2.4 parts of a 1N aqueous solution of sodium hydroxide.

Thereto was added an octamethyltetracyclosiloxane dispersion obtained by adding a mixture of 20 parts of octamethyltetracyclosiloxane as an organosiloxane compound, 0.6 part of tetraethoxysilane and 0.2 part of γ-methacryloyloxypropyltrimethoxysilane to 40 parts of water in which 0.28 part of sodium lauryl sulfate was dissolved, and dispersing it into water with a homomixer at 30,000 r.p.m. The reaction was carried out at 70° C. for 1 hour with stirring at 250 r.p.m.

Thereafter, the system was adjusted to pH about 1 by adding 12 parts of 1N hydrochoric acid, and it was heated to 90° C. and stirred at 250 r.p.m. for 5 hours at that temperature. After the completion of the reaction, the reaction mixture was allowed to stand overnight at room temperature, and the system was neutralized by adding 12 parts of a 1N aqueous solution of sodium hydroxide to give a latex of crosslinked rubber particles. The average particle size of the obtained crosslinked rubber particle latex was 0.23 μm. A part of the obtained latex was coagulated by salting out, and the precipitated particles were separated, washed and dried at 40° C. for 15 hours to give crosslinked rubber crumbs. The obtained crosslinked rubber particles (R-3) had a gel fraction of about 85%.

The above crosslinked rubber latex was taken out in an amount of 80 parts on a solid basis and placed in a separable flask equipped with a condenser, a nitrogen feeding tube, a dropping funnel and a stirrer. The total amount of water was adjusted to 300 parts, and thereto were then added 0.001 part of ferrous sulfate, 0.004 part of disodium ethylenediamine-tetraacetate and 0.1 part of formaldehyde sodium sulfoxylate. The mixture was heated to 70t with stirring at 250 r.p.m. in a nitrogen stream.

Subsequently, 18.0 parts of methyl methacrylate, 2.0 parts of n-butyl acrylate and 0.04 part of cumene hydroperoxide were put in the dropping funnel, and added dropwise to the rubber latex over 2 hours, followed by stirring at 70° C. for 2 hours. The conversion was 98%. The obtained latex of crosslinked rubber-based graft copolymer particles was coagulated by salting out, and the resulting particles were separated, washed and dried at 40° C. for 15 hours to give a powder of crosslinked rubber-based graft copolymer. The obtained crosslinked rubber-based graft copolymer particles (S-5) had a graft efficiency of 95% and an average particle size of 0.25 μm.

The gel fraction, graft efficiency, particle size, Izod impact strength and weatherability were measured in the same manner as in Example 1. The results are shown in Tables 1 and 2.

EXAMPLE 6

Crosslinked rubber particles (R-4) and crosslinked rubber-based graft copolymer particles (S-6) were prepared in the same manner as in Example 5 except that the amount of the isobutylene polymer, the amount of the vinyl monomer, the amount of the organosiloxane compound and the like were changed as shown in Table 1. The gel fraction, graft efficiency, particle size, Izod impact strength and weatherability were measured in the same manner as in Example 1. The results are shown in Tables 1 and 2.

EXAMPLE 7

There were mixed 100 parts of an isobutylene polymer having a silicon-containing terminal group as an isobutylene polymer (a polymer having an average molecular weight of 5,000 and containing about 90% of units derived from isobutylene monomer, prepared using p-dicumyl chloride as an initiator by a method disclosed in Japanese Patent Publication Kokoku No. 4-69659, silicon-containing terminal group being dimethoxymethylsilyl group), 1.0 part of γ-methacryloyloxypropyltrimethoxysilane and 50 parts of heptane. The resulting mixture was added to 200 parts of water in which 1.4 parts of sodium lauryl sulfate was dissolved. It was preliminarily dispersed into water with a homomixer at 30,000 r.p.m. and was then emulsified under a pressure of 900 kg/cm$^2$ with a homogenizer. The resulting mixture was placed in a separable flask equipped with a condenser, a nitrogen feeding tube and a stirrer, and thereto was added 2.4 parts of 1N hydrochloric acid in a nitrogen stream with stirring at 250 r.p.m. to adjust the system to pH about 2 and was further stirred for 15 minutes. The reaction system was then heated to 70° C. and the reaction was conducted at that temperature for 5 hours. The reaction mixture was neutralized with 2.4 parts of a 1N aqueous solution of sodium hydroxide. The average particle size of the obtained isobutylene rubber particle latex was 0.21 μm. A part of the obtained latex was coagulated by salting out, and the precipitated particles were separated, washed and dried at 40° C. for 15 hours to give isobutylene rubber crumbs. The obtained rubber (R-5A) had a gel fraction of about 85%. The results are shown in Table 1.

Then, 100 parts of octamethyltetracyclosiloxane as an organosiloxane compound, 3.0 parts of tetraethoxysilane and 1.0 part of γ-methacryloyloxypropyl-trimethoxysilane were mixed and added to 200 parts of water in which 1.4 parts of sodium lauryl sulfate was dissolved. After dispersing the mixture into water with a homomixer at 30,000 r.p.m., it was then emulsified under a pressure of 500 kg/cm$^2$ with a homogenizer. The resulting mixture was placed in a separable flask equipped with a condenser, a nitrogen feeding tube and a stirrer, and thereto was added 12.0 parts of 1N hydrochloric acid in a nitrogen stream with stirring at 250 r.p.m. to adjust the system to pH about 1 and was further stirred for 15 minutes. The reaction system was then heated to 90° C. and the reaction was conducted at that temperature for 5 hours. After the completion of the reaction, the reaction mixture was allowed to stand overnight at room temperature, and it was neutralized with 12.0 parts of a 1N aqueous solution of sodium hydroxide to give a latex of organosiloxane rubber particles.

The average particle size of the obtained organosiloxane rubber particle latex was 0.32 μm. A part of the obtained rubber latex was coagulated by salting out, and the precipitated particles were separated, washed and dried at 40° C. for 15 hours to give organosiloxane rubber crumbs. The obtained rubber (R-5B) had a gel fraction of about 85%. The results are shown in Table 1.

The latices of the rubber (R-5A) and the rubber (R-5B) were mixed in a weight ratio of 8/2 on a solid basis, and 80 parts (solid basis) of the mixed latex was placed in a separable flask equipped with a condenser, a nitrogen feeding tube, a dropping funnel and a stirrer. The total amount of water was adjusted to 300 parts, and thereto were added 0.001 part of ferrous sulfate, 0.004 part of disodium ethylenediaminetetraacetate and 0.1 part of formaldehyde sodium sulfoxylate. The mixture was heated to 70° C. with stirring at 250 r.p.m. in a nitrogen stream.

Subsequently, 18.0 parts of methyl methacrylate, 2.0 parts of n-butyl acrylate and 0.04 part of cumene hydroperoxide were put in the dropping funnel, and added dropwise to the crosslinked rubber latex over 2 hours, followed by stirring at 70° C. for 2 hours. The conversion was 98%. The obtained graft copolymer latex was coagulated by salting out, and the resulting particles were separated, washed and dried at 40° C. for 15 hours to give a powder of crosslinked rubber-based graft copolymer. The obtained crosslinked rubber-based graft copolymer particles (S-7) had a graft efficiency of 95% and an average particle size of 0.25 μm.

The gel fraction, graft efficiency, particle size, Izod impact strength and weatherability were measured in the same manner as in Example 1. The results are shown in Tables 1 and 2.

COMPARATIVE EXAMPLE 1

There were mixed 50 parts of an isobutylene polymer having a silicon-containing terminal group (a polymer having an average molecular weight of 5,000 and containing about 90% of units derived from isobutylene monomer, prepared using p-dicumyl chloride as an initiator by a method disclosed in Japanese Patent Publication Kokoku No. 4-69659, silicon-containing terminal group being dimethoxymethylsilyl group) as an isobutylene polymer, 0.5 part of γ-methacryloyloxypropyltrimethoxysilane, 50 parts of n-butyl acrylate as a vinyl monomer and 0.5 part of allyl methacrylate. The resulting mixture was added to 200 parts of water in which 1.4 parts of sodium lauryl sulfate was dissolved. It was preliminarily dispersed into water by a homomixer at 30,000 r.p.m. and was then emulsified under a pressure of 900 kg/cm$^2$ with a homogenizer. The resulting mixture was placed in a separable flask equipped with a condenser, a nitrogen feeding tube and a stirrer, and thereto was added 2.4 parts of 1N hydrochloric acid in a nitrogen stream with stirring at 250 r.p.m. to adjust the system to pH about 2 and was further stirred for 15 minutes. The reaction system was then heated to 70° C. and the reaction was conducted at that temperature for 5 hours. The reaction mixture was neutralized with 2.4 parts of a 1N aqueous solution of sodium hydroxide to give a latex of crosslinked rubber particles. The average particle size was 0.22 μm. A part of the obtained crosslinked rubber latex was coagulated by salting out, and the precipitated particles were separated, washed and dried at 40° C. for 15 hours to give crosslinked rubber crumbs. The obtained crosslinked rubber particles (R-6) had a gel fraction of about 85%.

The above crosslinked rubber latex was taken out in an amount of 80 parts on a solid basis and placed in a separable flask equipped with a condenser, a nitrogen feeding tube, a dropping funnel and a stirrer. The total amount of water was adjusted to 300 parts, and thereto were then added 0.001 part of ferrous sulfate, 0.004 part of disodium ethylenediaminetetraacetate and 0.1 part of formaldehyde sodium sulfoxylate. The mixture was heated to 70° C. with stirring at 250 r.p.m. in a nitrogen stream.

Subsequently, 18.0 parts of methyl methacrylate, 2.0 parts of n-butyl acrylate and 0.04 part of cumene hydroperoxide were put in the dropping funnel, and added dropwise to the rubber latex over 2 hours, followed by stirring at 70° C. for 2 hours. The conversion was 98%. The obtained latex of graft copolymer particles was coagulated by salting out, and the resulting particles were separated, washed and dried at 40° C. for 15 hours to give a powder of crosslinked rubber-based graft copolymer. The obtained crosslinked rubber-based graft copolymer particles (S-8) had a graft efficiency of 98% and an average particle size of 0.25 μm.

The gel fraction, graft efficiency, particle size, Izod impact strength and weatherability were measured in the same manner as in Example 1. The results are shown in Tables 1 and 2.

COMPARATIVE EXAMPLE 2

The Izod impact strength and weatherability were measured in the same manner as in Example 1 except that a commercially available acrylic impact modifier (Kaneace FM-2 1, made by Kaneka Corporation) was used instead of the graft copolymer (S-1). The results are shown in Tables 1 and 2.

TABLE 1

| | Crosslinked Rubber Particles | | | | | | | | | | |
|---|---|---|---|---|---|---|---|---|---|---|---|
| | Composition (part) | | | | | | | | Property | | |
| | Isobutylene polymer | | | Vinyl polymer | | Organosiloxane polymer | | | | | |
| Ex. No. | Isobutylene polymer Si-PIB | Graft-linking agent TSMA | Solvent Heptane | Vinly monomer BA | Graft-linking agent AlMA | Organo-siloxane monomer D4 | Graft-linking agent TSMA | Cross-linking agent TEOS | Gel fraction (%) | Average particle size (μm) | Siloxane content (%) | Identification of rubber particles |
| 1 | 80 | 0.8 | 40 | — | — | 20 | 0.2 | 0.6 | 85 | 0.28 | 14 | R-1 |
| 2 | 80 | 0.8 | 40 | — | — | 20 | 0.2 | 0.6 | 85 | 0.28 | 14 | R-1 |
| 3 | 80 | 0.8 | 40 | — | — | 20 | 0.2 | 0.6 | 85 | 0.28 | 14 | R-1 |
| 4 | 50 | 0.5 | 25 | — | — | 50 | 0.5 | 1.5 | 80 | 0.28 | 25 | R-2 |
| 5 | 40 | 0.4 | — | 40 | 0.4 | 20 | 0.2 | 0.6 | 85 | 0.23 | 11 | R-3 |
| 6 | 25 | 0.25 | — | 25 | 0.25 | 50 | 0.5 | 1.5 | 80 | 0.23 | 28 | R-4 |
| 7 | 100 | 1.0 | 50 | — | — | — | — | — | 85 | 0.21 | — | R-5A |
| | — | — | — | — | — | 100 | 1.0 | 3.0 | 85 | 0.32 | 100 | R-5B |
| Com. Ex. 1 | 50 | 0.5 | — | 5.0 | 0.5 | — | — | — | 85 | 0.22 | — | R-6 |

TABLE 1-continued

|  | | Graft Copolymer Particles | | | | | |
|---|---|---|---|---|---|---|---|
| Ex. No. | Crosslinked rubber particles (solid matter) | Vinyl monomer (part) | | Graft efficiency (%) | Average particle size (μm) | Identification of graft copolymer |
| | | MMA | BA | | | |
| 1 | R-1 (80) | 18 | 2 | 95 | 0.30 | S-1 |
| 2 | R-1 (70) | 27 | 3 | 95 | 0.30 | S-2 |
| 3 | R-1 (85) | 13.5 | 1.5 | 95 | 0.30 | S-3 |
| 4 | R-2 (80) | 18 | 2 | 95 | 0.30 | S-4 |
| 5 | R-3 (80) | 18 | 2 | 95 | 0.25 | S-5 |
| 6 | R-4 (80) | 18 | 2 | 95 | 0.25 | S-6 |
| 7 | R-5A (64) R-5B (16) | 18 — | 2 — | 95 — | 0.25 — | S-7 — |
| Com. Ex. 1 | R-6 (80) | 18 | 2 | 98 | 0.25 | S-8 |

TABLE 2

| Example No. | | 1 | 2 | 3 | 4 | 5 | 6 | 7 | Com. Ex. 1 | Com. Ex. 2 |
|---|---|---|---|---|---|---|---|---|---|---|
| PVC (part) | | 100 | 100 | 100 | 100 | 100 | 100 | 100 | 100 | 100 |
| Crosslinked rubber particles, etc. (part) | S-1 | 10 | — | — | — | — | — | — | — | — |
| | S-2 | — | 10 | — | — | — | — | — | — | — |
| | S-3 | — | — | 10 | — | — | — | — | — | — |
| | S-4 | — | — | — | 10 | — | — | — | — | — |
| | S-5 | — | — | — | — | 10 | — | — | — | — |
| | S-6 | — | — | — | — | — | 10 | — | — | — |
| | S-7 | — | — | — | — | — | — | 10 | — | — |
| | S-8 | — | — | — | — | — | — | — | 10 | — |
| | FM-21 | — | — | — | — | — | — | — | — | 10 |
| Izod impact strength | | | | | | | | | | |
| at 23° C. (kg · cm/cm²) | | 130 | 125 | 140 | 130 | 130 | 130 | 125 | 90 | 35 |
| at 0° C. | | 20 | 18 | 22 | 19 | 20 | 20 | 17 | 15 | 7 |
| Weatherability | | | | | | | | | | |
| for 500 hrs (kg · cm/cm²) | | 100 | 95 | 110 | 100 | 100 | 100 | 95 | 70 | 20 |
| for 1000 hrs (kg · cm/cm²) | | 80 | 70 | 85 | 80 | 80 | 80 | 70 | 50 | 10 |

EXAMPLE 8

Into 100 parts of a commercially available polypropylene resin, Noblen D501 (made by Sumitomo Chemical Company, Ltd.) was incorporated 10 parts of the crosslinked rubber (R-1), and the mixture was kneaded at 200° C. with a twin-screw extruder equipped with a vent (32 mm, L/D =25.5) to give a specimen for evaluation of physical properties. The Izod impact strength of the obtained specimen (3 mm thick) is shown in Table 3.

COMPARATIVE EXAMPLE 3

The molding and evaluation were made in the same manner as in Example 8 except that the crosslinked rubber particles were change to R-6. The results are shown in Table 3.

COMPARATIVE EXAMPLE 4

The molding and evaluation were made in the same manner as in Example 8 except that the crosslinked rubber particles were replaced by a commercially available ethylene-propylene copolymer rubber, Toughmer P0680 (made by Mitsui Petrochemical Industries, Limited). The results are shown in Table 3.

COMPARATIVE EXAMPLE 5

The molding and evaluation were made in the same manner as in Example 8 except that the commercially available polypropylene resin, Noblen D501 (made by Sumitomo Chemical Company, Ltd.) was used alone. The results are shown in Table 3.

TABLE 3

| Example No. | | 8 | Com.Ex.3 | Com.Ex.4 | Com.Ex.5 |
|---|---|---|---|---|---|
| PP (part) | | 100 | 100 | 100 | 100 |
| Crosslinked rubber particles, etc. (part) | R-1 | 10 | — | — | — |
| | R-2 | — | 10 | — | — |
| | EPR | — | — | 10 | — |
| Izod impact strength at 23° C. (kg · cm/cm²) | | 30 | 20 | 20 | 5 |

EXAMPLE 9

Into 100 parts of a commercially available cyclic polyolefin, Apel 6013 (made by Mitsui Petrochemical Industries, Ltd.) was incorporated 20 parts of the composite rubber (R-1), and the mixture was kneaded and pelletized at 26000 by a twin-screw extruder equipped with a vent (32 mm, LID=25.5). The obtained pellets were dried at 80° C. for 15 hours and then subjected to injection molding at 260° C. to give a specimen for evaluation of physical properties. The Izod impact strength of the obtained specimen (3 mm thick) is shown in Table 4.

TABLE 4

|  | Unit | Ex.9 | Com. Ex.6 | Com. Ex.7 | Com. Ex.8 |
|---|---|---|---|---|---|
| Thermoplastic resin COC | part by weight | 100 | 100 | 100 | 100 |
| Impact modifier R-1 |  | 20 | — | — | — |
| R-6 |  | — | 20 | — | — |
| EPR |  | — | — | 20 | — |
| Izod impact strength at 23° C. | kg · cm/cm² | 30 | 20 | 20 | 3 |

COMPARATIVE EXAMPLE 6

The molding and evaluation were made in the same manner as in Example 9 except that the composite rubber was changed to R-6. The results are shown in Table 4.

COMPARATIVE EXAMPLE 7

The molding and evaluation were made in the same manner as in Example 9 except that the composite rubber was replaced by a commercially available ethylene-propylene copolymer rubber (EPR), Toughmer P0680 (made by Mitsui Petrochemical Industries, Limited). The results are shown in Table 4.

COMPARATIVE EXAMPLE 8

The molding and evaluation were made in the same manner as in Example 9 except that the commercially available cyclic polyolefin, Apel 6013 (made by Sumitomo Chemical Company, Ltd.) was used alone. The results are shown in Table 4.

It is found that the products according to the present invention show a higher impact resistance in polypropylene, cyclic polyolefin and the like as compared with a graft copolymer containing a composite rubber composed of an isobutylene polymer and a vinyl polymer and also as compared with a commercially available conventional ethylene-propylene copolymer rubber.

EXAMPLE 10

Into 100 parts of a commercially available polycarbonate resin, L-1250 (made by Teijin Kasei Kabushiki Kaisha) was incorporated 10 parts of the composite rubber-based graft copolymer (S-1), and the mixture was kneaded and pelletized at 260° C. by a twin-screw extruder equipped with a vent (32 mm, L/D=25.5). The obtained pellets were dried at 80° C. for 15 hours and then subjected to injection molding at 260° C. to give a specimen for evaluation of physical properties. The Izod impact strength is shown in Table 5.

EXAMPLES 11 TO 14

The molding and evaluation were made in the same manner as in Example 10 except that the composite rubber-based graft copolymer was changed to S-4 to S-7, respectively. The results are shown in Table 5.

TABLE 5

|  | Unit | Ex. 10 | Ex. 11 | Ex. 12 | Ex. 13 | Ex. 14 | Com. Ex. 9 | Com. Ex. 10 | Com. Ex. 11 |
|---|---|---|---|---|---|---|---|---|---|
| Thermoplastic resin PC | part by weight | 100 | 100 | 100 | 100 | 100 | 100 | 100 | 100 |
| Impact modifier S-1 |  | 10 | — | — | — | — | — | — | — |
| S-4 |  | — | 10 | — | — | — | — | — | — |
| S-5 |  | — | — | 10 | — | — | — | — | — |
| S-6 |  | — | — | — | 10 | — | — | — | — |
| S-7 |  | — | — | — | — | 10 | — | — | — |
| S-8 |  | — | — | — | — | — | 10 | — | — |
| FM-21 |  | — | — | — | — | — | — | 10 | — |
| Izod impact strength at 23° C. | kg · cm/cm² | 80 | 80 | 80 | 80 | 70 | 60 | 50 | 8 |

COMPARATIVE EXAMPLE 9

The molding and evaluation were made in the same manner as in Example 10 except that the composite rubber-based graft copolymer was replaced by S-8. The results are shown in Table 5.

COMPARATIVE EXAMPLE 10

The molding and evaluation were made in the same manner as in Example 10 except that the composite rubber-based graft copolymer was replaced by a commercially available acrylic impact modifier, FM-2 1 (made by Kaneka Corporation). The results are shown in Table 5.

COMPARATIVE EXAMPLE 11

The molding and evaluation were made in the same manner as in Example 10 except that the commercially available polycarbonate resin, L-1250 (made by Teijin Kasei Kabushiki Kaisha) was used alone. The results are shown in Table 5.

EXAMPLE 15

Into 100 parts of a commercially available polybutylene terephthalate resin, Juranex 2002 (made by Polyplastics Kabushiki Kaisha) was incorporated 10 parts of the composite rubber-based graft copolymer (S-1), and the mixture was kneaded and pelletized at 260° C. by a twin-screw extruder equipped with a vent (32 mm, L/D=25.5). The obtained pellets were dried at 80° C. for 15 hours and then subjected to injection molding at 260° C. to give a specimen for evaluation of physical properties. The Izod impact strength of the obtained specimen is shown in Table 6.

EXAMPLES 16 TO 19

The molding and evaluation were made in the same manner as in Example 15 except that the composite rubber-based graft copolymer was replaced by S-4 to S-7, respectively. The results are shown in Table 6.

TABLE 6

|  |  | Unit | Ex. 15 | Ex. 16 | Ex. 17 | Ex. 18 | Ex. 19 | Com. Ex. 12 | Com. Ex. 13 | Com. Ex. 14 |
|---|---|---|---|---|---|---|---|---|---|---|
| Thermoplastic resin | PBT | part by weight | 100 | 100 | 100 | 100 | 100 | 100 | 100 | 100 |
| Impact modifier | S-1 |  | 10 | — | — | — | — | — | — | — |
|  | S-4 |  | — | 10 | — | — | — | — | — | — |
|  | S-5 |  | — | — | 10 | — | — | — | — | — |
|  | S-6 |  | — | — | — | 10 | — | — | — | — |
|  | S-7 |  | — | — | — | — | 10 | — | — | — |
|  | S-8 |  | — | — | — | — | — | 10 | — | — |
|  | FM-21 |  | — | — | — | — | — | — | 10 | — |
| Izod impact strength at 23° C. |  | kg · cm/cm² | 25 | 25 | 25 | 25 | 20 | 15 | 10 | 3 |

COMPARATIVE EXAMPLE 12

The molding and evaluation were made in the same manner as in Example 15 except that the composite rubber-based graft copolymer was replaced by S-8. The results are shown in Table 6.

COMPARATIVE EXAMPLE 13

The molding and evaluation were made in the same manner as in Example 15 except that the composite rubber-based graft copolymer was replaced by a commercially available acrylic impact modifier, FM-21 (made by Kaneka Corporation). The results are shown in Table 6.

COMPARATIVE EXAMPLE 14

The molding and evaluation were made in the same manner as in Example 15 except that the commercially available polybutylene terephthalate resin, L-1250 (made by Teijin Kasei Kabushiki Kaisha) was used alone. The results are shown in Table 6.

From the results shown above, it is understood that the crosslinked rubber-based graft copolymer particles of the present invention exhibit a higher impact resistance-improving effect in vinyl chloride resin compositions as compared with a commercially available conventional acrylic impact modifier, and are also excellent in weatherability.

It is also understood that the crosslinked rubber-based graft copolymer particles of the present invention exhibit a higher impact resistance-improving effect than graft copolymer particles containing a crosslinked rubber composed of an isobutylene polymer and a vinyl polymer.

It is understood that the crosslinked rubber particles of the present invention exhibit a higher impact resistance-improving effect in polypropylene resin compositions as compared with a commercially available conventional ethylene-propylene rubber.

It is also understood that the crosslinked rubber particles of the present invention exhibit a higher impact resistance-improving effect than crosslinked rubber particles composed of an isobutylene polymer and a vinyl polymer.

It is understood that the crosslinked rubber particles of the present invention exhibit a higher impact resistance-improving effect in cyclic polyolefin resin compositions as compared with a commercially available conventional ethylene-propylene rubber.

It is also understood that the crosslinked rubber particles of the present invention exhibit a higher impact resistance-improving effect than crosslinked rubber particles composed of an isobutylene polymer and a vinyl polymer.

It is understood that the crosslinked rubber-based graft copolymer particles of the present invention exhibit a higher impact resistance-improving effect in polycarbonate resin compositions as compared with a commercially available conventional acrylic impact modifier, and are also excellent in weatherability.

It is also understood that the crosslinked rubber-based graft copolymer particles of the present invention exhibit a higher impact resistance-improving effect than graft copolymer particles containing a crosslinked rubber composed of an isobutylene polymer and a vinyl polymer.

It is understood that the crosslinked rubber-based graft copolymer particles of the present invention exhibit a higher impact resistance-improving effect in polybutylene terephthalate resin compositions as compared with a commercially available conventional acrylic impact modifier, and are also excellent in weatherability.

It is also understood that the crosslinked rubber-based graft copolymer particles of the present invention exhibit a higher impact resistance-improving effect than graft copolymer particles containing a crosslinked rubber composed of an isobutylene polymer and a vinyl polymer.

The crosslinked rubber particles and crosslinked rubber-based graft copolymer particles of the present invention are particularly useful, for example, as an impact modifier, and compositions containing various thermoplastic resins with them are superior in moldability and can provide molded articles excellent in impact resistance, weatherability, heat resistance and the like.

What we claim is:

1. Graft copolymer particles prepared by graft-copolymerizing at least one vinyl monomer onto crosslinked rubber particles comprising an isobutylene polymer component and an organoxiloxane polymer component.

2. The graft copolymer particles of claim 1, wherein said vinyl monomer used for the graft polymerization is at least one monomer selected from the group consisting of an acrylic acid ester, a methacrylic acid ester, an aromatic alkenyl compound, a vinyl cyanide compound, a conjugated diene compound and a halogen-containing unsaturated compound.

3. The graft copolymers of claim 1, which comprise 30 to 95% by weight of said crosslinked rubber particles and 70 to 5% by weight of a component of said vinyl monomer.

4. The graft copolymer particles of claim 1, wherein said crosslinked rubber particles further contain a vinyl polymer component.

5. The graft copolymer particles of claim 1, wherein said crosslinked rubber particles comprise 1 to 99% by weight of an isobutylene polymer component, 1 to 99% by weight of an organosiloxane polymer component, and 0 to 90% by weight of a vinyl polymer component.

6. The graft copolymer particles of claim 1, wherein said crosslinked rubber particles contain 0 to 20% by weight of a portion derived from a crosslinking agent and 0 to 20% by weight of a portion derived from a graftlinking agent.

7. The graft copolymer particles of claim 1, wherein said isobutylene polymer component is a component derived from an isobutylene polymer containing at least 50% by weight of units derived from isobutylene monomer and having in its molecular end and/or its molecular chain at least one reactive functional group selected from the group consisting of a halogen-containing group, a radically reactive unsaturated group and a silicon-containing group.

8. The graft copolymer particles of claim 7, wherein said radically reactive unsaturated group is a group derived from a conjugated diene monomer.

9. The graft copolymer particles of claim 7, wherein said radically reactive unsaturated group is a member selected from the group consisting of vinyl group, allyl group, isopropenyl group, acryloyl group and methacryloyl group.

10. The graft copolymer particles of claim 1, wherein said isobutylene polymer component is a component derived from an isobutylene polymer containing at least 50% by weight of units derived from isobutylene monomer and having a reactive silicon-containing group in its molecular end and/or its molecular chain.

11. The graft copolymer particles of claim 1, wherein said organosiloxane polymer component is a component derived from an organosiloxane polymer obtained by polymerizing a cyclic organosiloxane.

12. The graft copolymer particles of claim 4, wherein said vinyl polymer component in said crosslinked rubber particles is a component derived from a vinyl polymer obtained by polymerizing at least one monomer selected from the group consisting of an acrylic acid ester, a methacrylic acid ester, an aromatic alkenyl compound, a vinyl cyanide compound, a conjugated diene compound and a halogen-containing unsaturated compound.

13. The graft copolymer particles of claim 1, wherein said crosslinked rubber particles have an average particle size of 0.05 to 10 $\mu$m.

14. The graft copolymer particles of claim 1, wherein said crosslinked rubber particles have a gel fraction of at least 20% by weight.

15. The graft copolymer particles of claim 4, wherein said crosslinked rubber particles are prepared by emulsion polymerization of an organosiloxane monomer and a vinyl monomer in the presence of an isobutylene polymer having a reactive functional group in its molecular end and/or its molecular chain and at least one of a crosslinking agent and a graftlinking agent.

16. A thermoplastic resin composition comprising a thermoplastic resin and a graft copolymer wherein a vinyl monomer is graft-polymerized onto a crosslinked rubber comprising an isobutylene polymer component and an organosiloxane polymer component.

17. The composition of claim 16, wherein said crosslinked rubber further contains a vinyl polymer component.

18. The composition of claim 16, wherein said thermoplastic resin is at least one member selected from the group consisting of polyvinyl chloride, polymethyl methacrylate, polyolefin, polystyrene, acrylonitrile-styrene copolymer, polycarbonate, polyester, polyamide, polyphenylene ether, polyacetal, polysulfone, polyphenylene sulfide, polyimide, polyether ketone and polyarylate.

19. The composition of claim 16, wherein said thermoplastic resin is at least one member selected from the group consisting of polyvinyl chloride, acrylonitrile-styrene copolymer, polycarbonate, polyester, polyamide and polyphenylene ether.

* * * * *